(No Model.)

I. N. MILLER & J. B. MOSS.
SUPPOSITORY.

No. 604,063. Patented May 17, 1898.

Witnesses:

Inventors
I. N. Miller
J. B. Moss
By James J. Sheehy
Attorney

UNITED STATES PATENT OFFICE.

ISAAC NEWTON MILLER AND JOSIAH BEATIE MOSS, OF ST. JOSEPH, MISSOURI.

SUPPOSITORY.

SPECIFICATION forming part of Letters Patent No. 604,063, dated May 17, 1898.

Application filed September 20, 1897. Serial No. 652,288. (No model.)

*To all whom it may concern:*

Be it known that we, ISAAC NEWTON MILLER and JOSIAH BEATIE MOSS, citizens of the United States, residing at St. Joseph, in the county of Buchanan and State of Missouri, have invented certain new and useful Improvements in Suppositories; and we do declare the following to be a full, clear, and exact description of the invention, such as will enable others skilled in the art to which it appertains to make and use the same.

Our invention relates to improvements in suppositories; and its novelty and many advantages will be fully understood from the following description and claims when taken in conjunction with the annexed drawings, in which—

Figure 1:
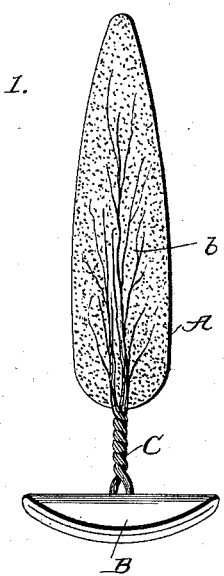
Figure 2:
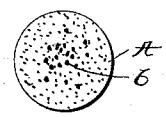
Figure 3:
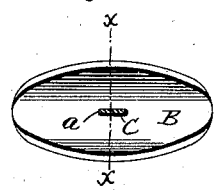
Figure 4:
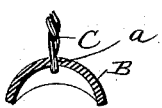

Figure 1 is a section view of our improved suppository with the body in diametrical section and the other parts in elevation. Fig. 2 is a transverse section of the body. Fig. 3 is an inverted view of the anchor, and Fig. 4 is a transverse section taken in the plane indicated by the line $x$ $x$ of Fig. 3.

In the said drawings similar letters designate corresponding parts in all of the several views, referring to which—

A indicates the body of our improved suppository, which is preferably of the size and shape illustrated in Figs. 1 and 2. This body A is formed of medicine or medicines suitable for treating rectal diseases, and while in a plastic state it is molded or otherwise caused to assume the shape shown and is permitted to harden, so that when in use it will be from one to two hours in dissolving and will effect a slow application of the medicine or medicines to the affected parts.

Suppositories, as a rule, are moved by the contraction of the muscles of the rectum up into the rectum and above the seat of disease, where the medicine or medicines of which they are formed are wasted. To remedy this fault and hold the suppository in direct contact with that portion of the rectum where all rectal diseases are found, we provide what we will for convenience of description term the "anchor" B. This anchor B may be of any suitable construction and of any suitable material, although we prefer to form it of an elliptical disk of soft rubber, felt, or other suitable material and bend it into concavo-convex shape in cross-section, as shown in cross-section, so as to enable it to comfortably conform to the body of the patient.

C indicates the stem, which connects the body A and anchor B. This stem C is preferably formed of a cord of silk, linen, or cotton, which is passed in the form of a bight or loop through apertures $a$ in the anchor, and has the branches of said bight or loop twisted together and connected to the body A in the manner shown—that is to say, by fraying their ends, as indicated by $b$, and embedding the same in the body at the time of molding or otherwise forming the same. This connection of the stem C and body A, while adapted to be easily effected, is strong and durable and precludes a casual disconnection of the anchor from the body. The embedding of the frayed ends of the cord forming the stem C serves, in addition to connecting the stem and body A, to tie or hold the material forming the said body A together, and thereby lessen the liability of the body being broken in handling.

The anchor B will serve effectually to hold the suppository-body A in direct contact with the affected parts of the rectum, so as to enable it to continuously apply the medicine thereto, and the smallness of the stem or shank C in cross-section will avoid stretching of the external sphincter muscle, and thereby prevent the patient from having any desire to expel the device, which is an important advantage.

As before stated, the body A is made hard, and being anchored it will afford a slow application of the medicine while held to the diseased parts, and thereby get the full effect of the medicine, and it is also advantageous to have the body hard, as much benefit is derived simply from the contact of the hard body and the wall of the rectum.

Having thus described our invention, what we claim is—

1. A suppository comprising the hard body formed of medicine or medicines, an anchor, and a flexible stem or shank interposed between the body and the anchor; the said stem or shank being formed of cord and having one end of said cord connected to the anchor and its opposite end frayed and embedded in the body, substantially as specified.

2. A suppository comprising the hard body formed of medicine or medicines, the anchor of general elliptical form and concavo-convex shape in cross-section made from rubber or other suitable material, and a stem or shank formed of cord and connected at one end to the anchor and having its opposite end frayed and embedded in the body, substantially as specified.

In testimony whereof we affix our signatures in presence of two witnesses.

ISAAC NEWTON MILLER.
JOSIAH BEATIE MOSS.

Witnesses:
CLIFFORD A. TANEY,
J. S. CARBEY.